United States Patent [19]

Frommelt et al.

[11] 3,939,614
[45] Feb. 24, 1976

[54] LOADING DOCK SEAL
[75] Inventors: Cyril P. Frommelt; Sylvan J. Frommelt, both of Dubuque, Iowa
[73] Assignee: Dubuque Awning & Tent Company, Dubuque, Iowa
[22] Filed: July 26, 1974
[21] Appl. No.: 492,161

[52] U.S. Cl. .................... 52/2; 49/477; 52/173 DS; 135/5 A
[51] Int. Cl.[2] .......................................... E06B 7/22
[58] Field of Search ............ 52/2, 173 DS; 135/5 A; 49/477

[56] References Cited
UNITED STATES PATENTS

| | | | |
|---|---|---|---|
| 3,501,868 | 3/1970 | Ganzinotti | 52/2 |
| 3,601,935 | 8/1971 | Cadwell | 52/2 |
| 3,714,745 | 2/1973 | O'Neal | 52/173 DS |

*Primary Examiner*—J. Karl Bell
*Attorney, Agent, or Firm*—Johnson, Dienner, Emrich & Wagner

[57] ABSTRACT

A loading dock seal embodying an inflatable member disposed in overlying relation to a resilient, compressible pad member.

8 Claims, 8 Drawing Figures

U.S. Patent  Feb. 24, 1976  Sheet 1 of 3  3,939,614
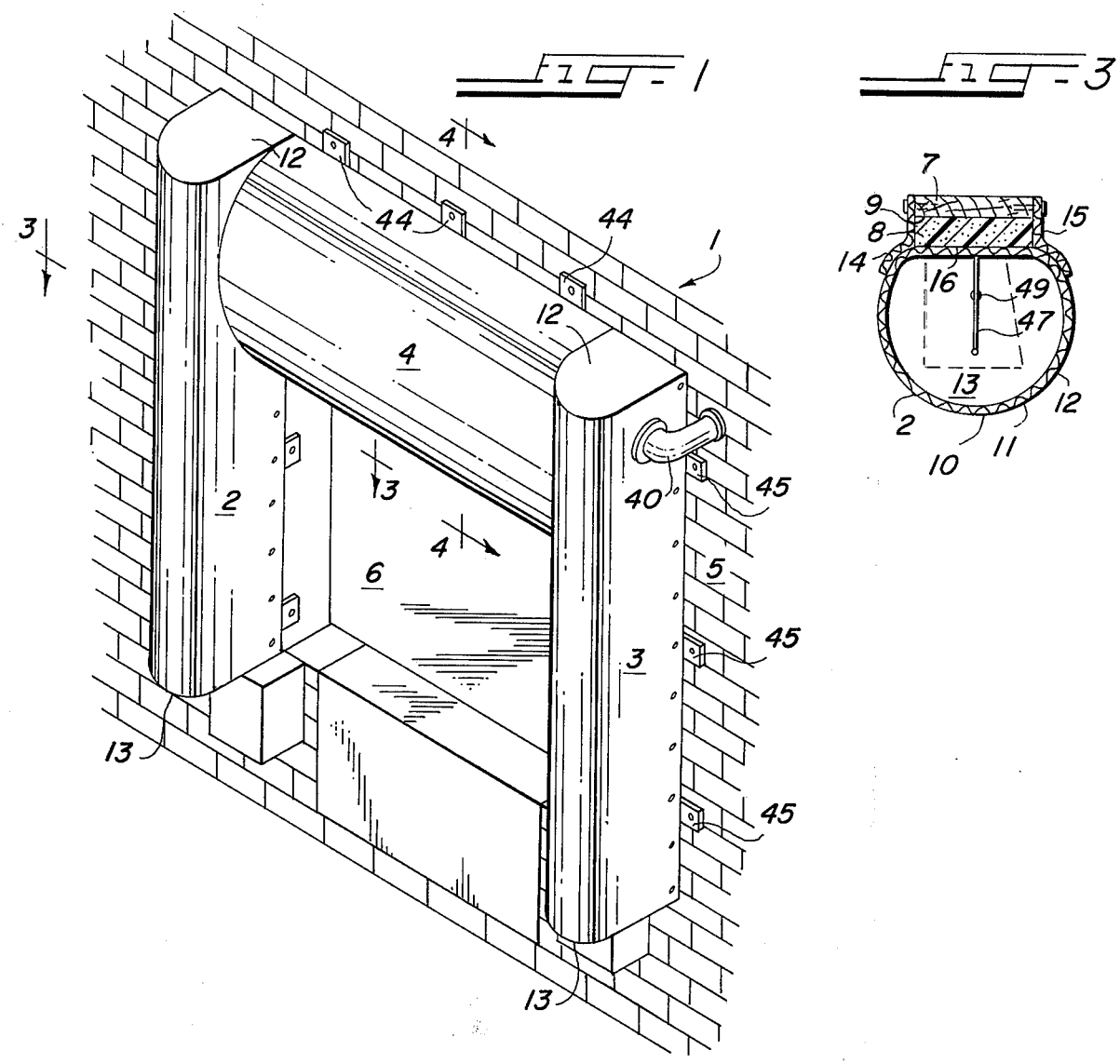
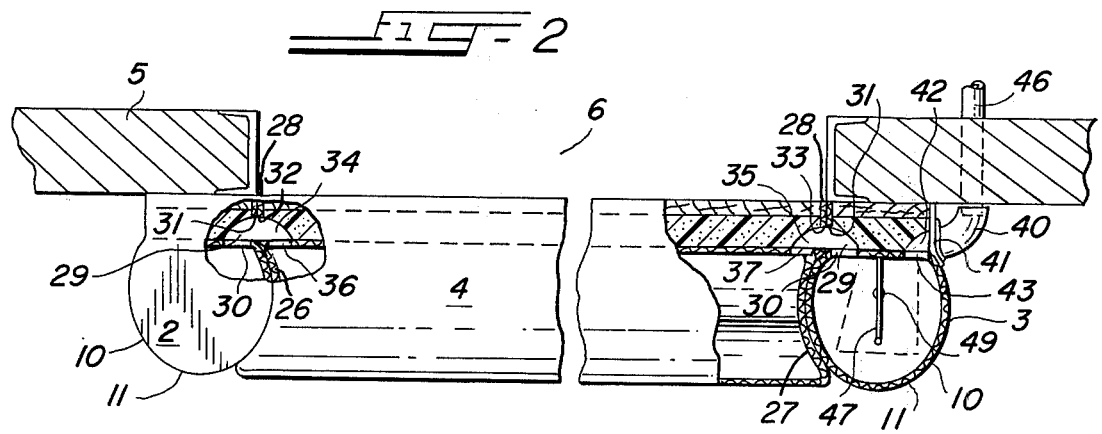

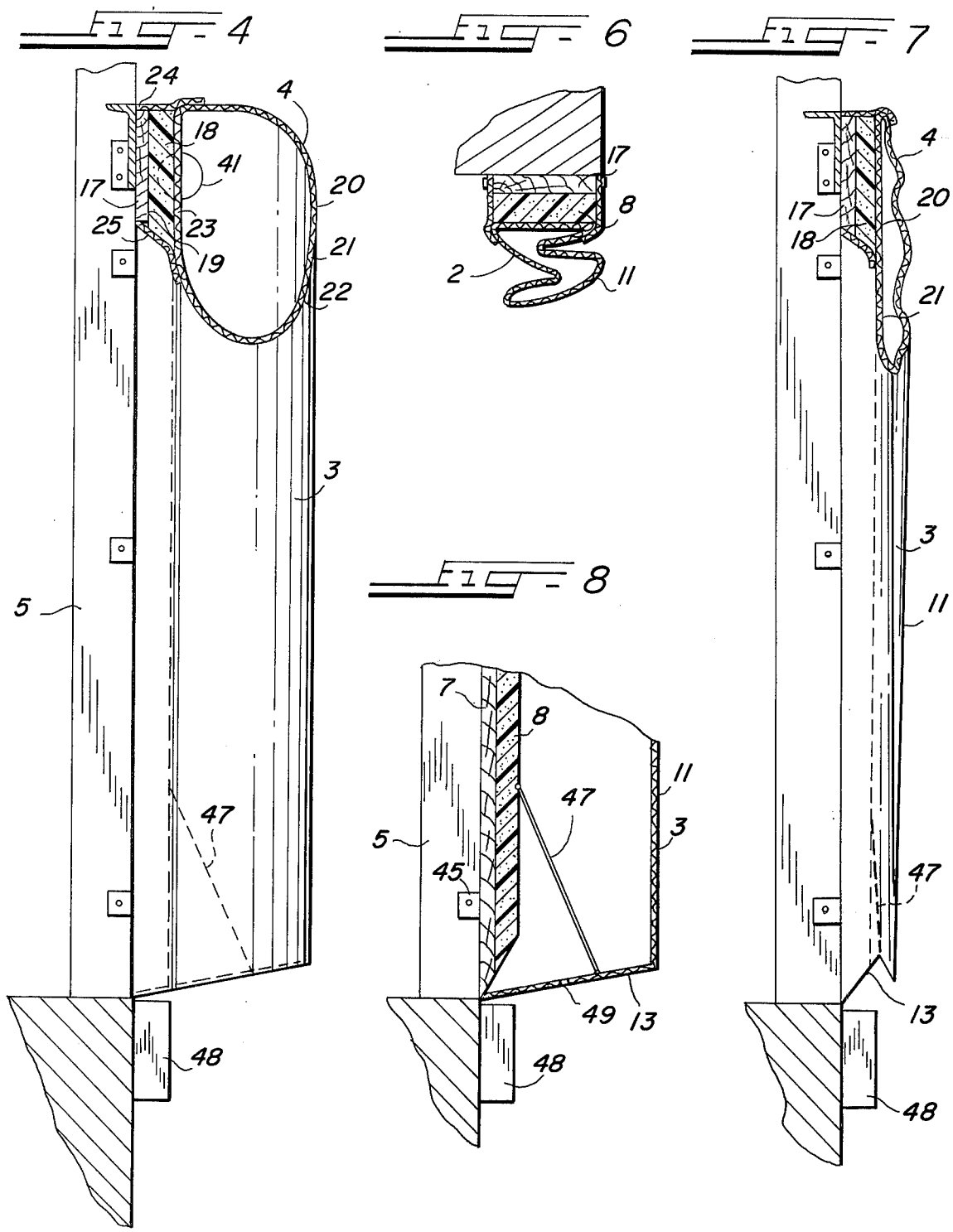

LOADING DOCK SEAL

BACKGROUND OF THE INVENTION

This invention relates to loading dock seals, and more particularly, to loading dock seals of the inflatable type.

It is a primary object of the present invention to afford a novel loading dock seal. Another object is to afford a novel loading dock seal of the inflatable type.

Loading dock seals of the inflatable type have been heretofore known in the art being shown, for example, in U.S. Pat. Nos. 3,303,615, 3,391,502, 3,391,503 and 3,714,745, issued to Larry O'Neal, and in U.S. Pat. No. 2,634,589, issued to Broadus Wilson et al. However, inflatable loading dock seals heretofore known in the art have commonly had several disadvantages, such as, for example, being large and bulky in size; requiring excessive amounts of material in the construction thereof; being difficult to install; being difficult to repair or replace; being subject to excessive drooping or sagging when in deflated condition; not affording an effective seal when in deflated condition; being complicated in construction and operation; or, being difficult and expensive to manufacture, and the like. It is an important object of the present invention to overcome such difficulties.

Another object of the present invention is to afford a novel loading dock seal of the inflatable type which can be quickly and easily installed in a novel and expeditious manner.

Yet another object is to afford a novel loading dock seal of the inflatable type wherein separate individual sections may be quickly and easily removed and replaced in the event of damage thereto or the malfunction thereof.

A further object of the present invention is to afford a novel loading dock seal of the inflatable type wherein the various portions thereof may be connected together in a novel and expeditious manner for the passage of air therebetween.

Another object of the present invention is to afford a novel loading dock seal of the inflatable type which affords effective sealing engagement between a truck and a warehouse doorway, even when the seal is in deflated condition.

An object ancillary to the foregoing is to afford a novel loading dock seal of the inflatable type which embodies a resilient pad constituted and arranged therein in a novel and expeditious manner effective to afford effective sealing engagement between such a truck and the seal, when the seal is in deflated condition.

Another object of the present invention is to afford a novel loading dock seal of the aforementioned type which is practical and efficient operation, and which may be readily and economically produced commercially.

Other and further objects of the present invention will be apparent from the following description and claims and are illustrated in the accompanying drawings which, by way of illustration, show the preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a front perspective view of a loading dock seal embodying the principles of the present invention, showing the seal mounted on a warehouse doorway;

FIG. 2 is a top plan view of the seal shown in FIG. 1, with certain parts broken away to show underlying parts;

FIG. 3 is a detail sectional view taken substantially along the line 3—3 in FIG. 1.

FIG. 4 is a sectional view taken substantially along the line 4—4 in FIG. 2;

FIG. 6 is a view similar to FIG. 3, but showing the loading dock seal in deflated condition;

FIG. 7 is a view similar to FIG. 4, but showing the loading dock seal in deflated condition; and FIG. 8 is a fragmentary, sectional view taken substantially along the line 8—8 in FIG. 1.

DESCRIPTION OF THE EMBODIMENT SHOWN HEREIN

Figure 5:
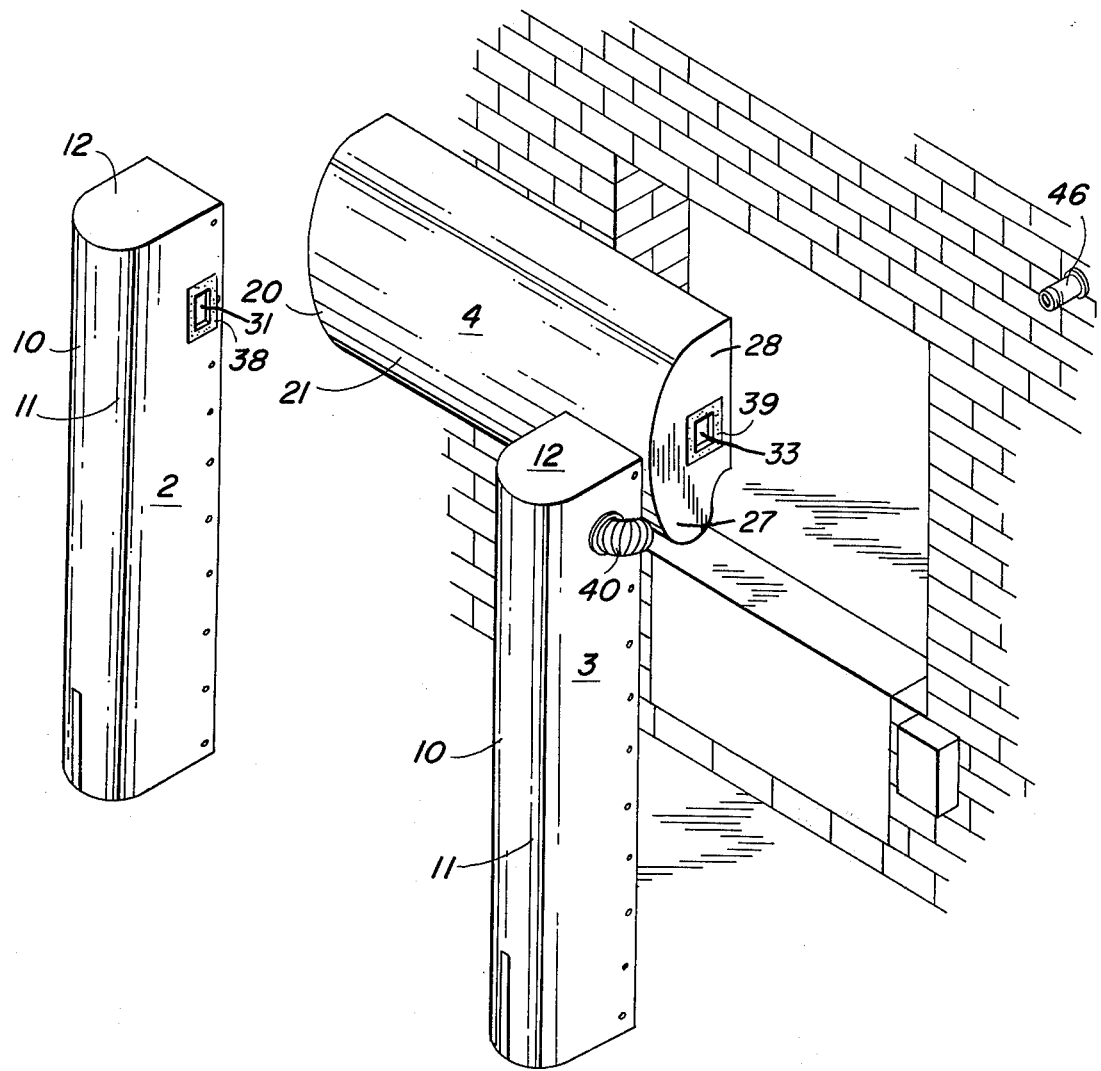
FIG. 5 is an exploded, perspective view of the loading dock seal shown in FIG. 1.

A loading dock seal 1, embodying the principles of the present invention, is shown in the drawings to illustrate the presently preferred embodiment of the present invention.

The loading dock seal 1, embodies, in general, two side sections 2 and 3, and a head section or top section 4, FIG. 1. The side sections 2 and 3 are adapted to be mounted on a warehouse wall 5, or the like, adjacent to respective lateral sides of a doorway 6 therein, and the head section 4 is adapted to be mounted on the wall 5 in position to extend across the top of the doorway 6 between the upper end portions of the side sections 2 and 3, as shown in FIG. 1.

The side sections 2 and 3 are identical in construction, except that they are mirror images of each other. Each embodies an elongated, substantially flat mounting plate or backing member 7, FIG. 3, which may be made of any suitable material, such as, for example, steel or wood. An elongated, resilient, compressible pad member 8 is mounted on an inner or front face 9 of the backing member 7 in covering relation thereto. The pads 8, may be made of any suitable material, such as, for example, any suitable natural or synthetic, compressible, resilient resin or polymer, our preferred material being a foamed polyether or polyester. Preferably, the pad 8 is adhesively secured to the face 9 of the backing member 7 by a suitable adhesive, such as, for example, an epoxy resin or the like.

Each of the side sections 2 and 3 also embodies an elongated inflatable member 10 having an elongated tubular body portion 11, FIGS. 1 and 3, having end caps 12 and 13 mounted on the upper and lower end portions thereof. The caps 12 and 13 completely cover the respective ends of the tubular body member 11, and are secured thereto by suitable means such as stitching, not shown. The body members 11 and the end caps 12 and 13 preferably are made of a suitable, substantially air-impervious material, such as, for example, rubber impregnated nylon fabric, or the like, and the lower ends of the body members 11, preferably, are cut on an upwardly and forwardly sloping angle, FIG. 8, so as to reduce the amount that the latter hangs down in deflated condition.

Each of the inflatable members 10 also embodies two securing members, in the form of two elongated, substantially parallel, spaced flaps 14 and 15, which extend from one side of the respective body member 11, FIG. 3. The flaps 14 and 15 may be made of the same material as that of the body member 11 and the end caps 12 and 13, and are secured to the body member 11 by a suitable means such as, for example, stitching, not shown. The flaps 14 and 15 are secured to respective opposite longitudinal edges of the backing member 7 in the respective side section 2 or 3 by suitable means, such as, for example, nails or screws, not shown, and preferably are of such length that, when so secured to the backing member 7, the tubular member 11 is held in firm engagement with the front face 16 of the pad 8 remote from the backing member 7.

The head section 4 is similar in construction to the side sections 2 and 3, FIG. 4. It embodies an elongated, substantially flat backing member or mounting plate 17 having an elongated, resilient, compressible pad member 18 adhesively secured to the front or inner face 19 thereof by suitable adhesive, such as for example, the aforementioned epoxy resin. Like the side sections 2 and 3, the head section 4 embodies an inflatable member 20, which includes a tubular body portion 21. However, unlike the tubular body portions 11 of the side sections 2 and 3, which, preferably are substantially round in transverse cross-section when in inflated condition, FIG. 3, the tubular body portion 21 of the head section 4 preferably has what may be considered as substantially a tear-drop transverse cross-sectional shape when inflated condition, the main body portion 22 thereof curving forwardly and downwardly from the front face 23 of the pad 18, which is remote from the backing member 17, FIG. 4.

Like the inflatable members 10, the inflatable member 20 has two flaps 24 and 25 extending from the tubular body portion 21 thereof in substantially parallel spaced relation to each other. In the assembled head section 4, the flap 24 is secured to the top edge of the backing member 17 and the flap 25 is secured to the lower edge of the backing member 17 by suitable fastening means such as, for example, nails or screws, not shown. Also, like the tubular body members 11, the tubular body member 21 has two end caps 26 and 27, FIG. 2, secured to the respective opposite ends thereof by suitable means, such as, for example, stitching, not shown, each of the caps 26 and 27 having a flap 28 extending rearwardly therefrom in covering relation to the adjacent end of the pad 18 and secured to the adjacent end edge of the backing member 17 by suitable means such as, for example, nails or screws, not shown.

Each of the side sections 2 and 3 has an opening, in the form of a recess 29, formed in the front inner edge portion of the upper portion of the pad member 8 thereof, which is disposed adjacent to the head section 4, FIG. 2. An opening 30 is formed in the tubular body member 11 adjacent to and in communication with the recess 29 in each of the side sections 2 and 3. Another opening 31 is formed in the inner flap 15 of the inflatable member 10 on each of the side sections 2 and 3 in communication with the aforementioned recess 29 in that side section.

Similarly, the head section 4 has an opening 32 and 33, respectively, formed in the respective flaps 28 disposed at the opposite ends thereof. The openings 32 and 33 are so positioned in the inflatable member 20 that, when the head section 4 and the side sections 2 and 3 are disposed in assembled relation to each other, as shown in FIG. 1, the openings 32 and 33 are disposed in aligned communication with the openings 31 in the side sections 2 and 3, respectively. Openings, in the form of recesses 34 and 35, are formed in the front edge portions of the respective opposite ends of the pad 18 of the head section 4 in position to be disposed in communication with the openings 32 and 33, respectively. Other openings 36 and 37 are formed in the respective opposite end portions of the tubular member 21 in position to be disposed in communication with the recesses 34 and 35, respectively.

In the preferred form of loading dock seal shown in the drawings, a securing member or fastening member 38, in the form of an elongated, substantially rectangular-shaped strip, is mounted on and secured to the outer face of the inner flap 15 of each of the respective side sections 2 and 3 in closely adjacent relation to the marginal edges of the openings 31 therethrough, FIG. 2 and 5. Two other fastening members 39, which are similar in size and shape to the fastening members 38, are mounted on the outer face of the respective flaps 28 on the ends of the head section 4, FIGS. 2 and 5. The fastening members 39 are disposed in such position on the head section 4 that each of them is disposed in laterally, parallel, juxtaposition to a respective one of the fastening members 38 when the head section 4 and the side sections 2 and 3 are disposed in the aforementioned, normal assembled position, FIG. 1.

The fastening members 38 and 39 are of the type which, when they are pressed into engagement with each other, firmly but releasably adhere to each other to afford a strong connection for holding the openings 32 and 33 in the opposite ends of the head section 4 in operable communication with the adjacent opening 31 in the side sections 2 and 3, respectively, for the passage of air therethrough, but with the connection being such that it may be readily torn apart, manually, when it is desired to release the head section 4 from either one or both of the side sections 2 or 3, such as, for example, if it is desired to remove and replace one or more of the sections 2–4. The members 38 and 39 preferably are strips of fastening material of the type readily available on the market under the trademark "Velcro," wherein the face of one of the complimentary strips 38 and 39, which faces toward the other complimentary strip 39 or 38, respectively, constitutes a brushed suitable material such as nylon, or the like, to present a fuzzy face, and the other of the respective complimentary strips 39 or 38 has a face embodying a plurality of small hooks formed from nylon, or the like, with the hooks operable to releasably engage in, and thereby adhere to the fuzzy face of the respective complimentary strip. However, the fastening members 38 and 39 may be of other suitable material, such as, for example, suitable pressure-sensitive adhesive material, commonly available on the market which may be repeatedly adhered to and released from each other.

A flexible coupling or nozzle 40, which may be made of any suitable, substantially air-impervious material, such as, for example, the aforementioned rubber-impregnated nylon fabric, or the like, is secured to the laterally outer face of the side pad 3 by any suitable means, such as, for example, stitching it to the flap 14 and the adjacent portion of the tubular body member 11 of the inflatable member 10 in the side section 3, FIG. 2. The coupling 40 is thus secured to the side section 3 in communication with an opening 41 which is formed in the inflatable member 10 and extends across a front edge portion of the pad 8 and a rear edge portion of the tubular member 11 of the pad 3. An opening, in the form of a recess 42, is formed in the aforementioned front edge portion of the pad 8 in the side section 3 in communication with the opening 41, and an opening 43 is formed in the tubular body member 11 in communication with the opening 42, so that air passing inwardly through the coupling 40 may flow freely into the tubular body member 11 of the side section 3, for a purpose which will be discussed in greater detail presently.

The loading dock seal 1 may be mounted in any suitable manner on a warehouse wall, such as the wall 5, but, preferably, the head section 4 is first secured in position on the warehouse wall 5 by suitable means such as suitable mounting brackets 44, FIGS. 1 and 4, and the side sections 2 and 3 are then moved into the proper position relative to the head section 4, and, likewise, secured to the outer face of the warehouse wall 5 by suitable means such as mounting brackets 45. During the positioning of the side sections 2 and 3 relative to the head section 4, the fastening members 38 thereon may be manually pressed into operative engagement with the adjacent fastening members 39 on the head section 4, to thus innerconnect the head section 4 and the side sections 2 and 3 for the passage of air therebetween, for a purpose which will be discussed in greater detail presently.

After the sections 2–4 have thus been mounted on the wall 5 in interconnected relation to each other, the free end of the coupling 40 may then be secured to a suitable source of air, such as an air line 46 mounted in the warehouse wall 5 and connected to a suitable source of low pressure air, not shown, FIG. 2. As will be appreciated by those skilled in the art, the air line 46 is shown herein merely by way of illustration, and not by way of limitation, and other suitable sources of air supply such as, for example, a low pressure blower mounted on the outer or inner face of the warehouse wall 5 may be substituted therefore without departing from the purview of the broader aspects of the present invention. A suitable air vent, not shown, is embodied in the source of air supply, such as the air line 46, so that when air is not being fed from the supply line 46 through the coupling 40 into the loading dock seal 1, the air in the loading dock seal 1 is free to escape through the coupling 40 and the source of air supply to the atmosphere.

With the loading dock seal 1 constructed in the aforementioned manner, when it is mounted in operative position on the warehouse wall 5 around the doorway 6, and air is not being fed through the coupling 40 into the loading dock seal 1, the inflatable member 20 of the head section 4 is disposed in deflated, collapsed position, as shown in FIG. 7, wherein it hangs downwardly from the front face of the pad 18 in the manner of a head curtain; and the inflatable members 10 of the side sections 2 and 3 are disposed in collapsed, substantially flat, deflated position, as shown in FIG. 6, wherein they may be readily pressed inwardly against the respective foam pads 8.

In the preferred form of the loading dock seal 1, shown in the drawings, suitable resilient cords 47, such as, for example, elastic cords of the type known in the art as Bungee cords, are secured to the central portions of the lower end caps 13 on the side sections 2 and 3, and extend upwardly therefrom and are secured at their upper ends to the front face of the pad 8 by suitable means, such as, for example, nails or screws, not shown, inserted into the respective backing members 7. The cords 47 are of such length that, when the side pads 2 and 3 are in collapsed, deflated condition, the cords 47 are effective to support the lower end portions of the side sections 2 and 3 in such position that they do not hang downwardly a substantial amount. With this construction, it may be effectively assured that the side sections 2 and 3, when deflated, will not hang downwardly in front of projections disposed therebelow, such as, for example, the bumpers 48, and, thus, the side sections 2 and 3 will not be squeezed between such projections, as the bumpers 48, and a truck which may be backed into engagement therewith, when the loading dock seal 1 is in deflated condition.

If desired, a suitable small vent 49 may be mounted in the bottom of the tubular body member 11 of each of the side sections 2 and 3 to afford drainage for condensation, which may form therein, so as to insure that such condensation will not accumulate in the loading dock seal 1.

In the operation of the loading dock seal 1, the inflatable members 10 and 20, normally, are maintained in deflated condition when not in use. When it is desired to inflate the latter, low pressure air may be fed from the source of air supply, such as the pipe 46, through the coupling 40 and the openings 41–43, FIG. 2, into the tubular body member 11 of the side pad 3. The air is effective to inflate the tubular body member 11 of the side pad 3, and during the inflation thereof a part of the air being fed from the coupling 40 passes from the tubular body member 11 of the side section 3, FIG. 2, into the opening 33 in the head section 4, from which it flows through the openings 35 and 37 into the inflatable member 20 of the head section 4 to commence the inflation of the tubular member 21 thereof. During the inflation of the tubular member 21 of the head section 4, part of the air flowing thereinto flows through the openings 36, 34 and 32 therein, FIG. 2, into the opening 31 in the inflatable member 10 of the side section 2, from which it flows through the openings 29 and 30 into the tubular body member 11 of the side section 2 and initiates inflation of the latter. Normally, with the coupling 40 attached to the side section 3 in the aforementioned manner, the latter tends to substantially, fully inflate prior to the other sections 2 and 4, with the head section 4 and then the side section 2 successively becoming fully inflated. As will be appreciated by those skilled in the art, the coupling 40 is shown connected to the side section 3 merely by way of illustration and not by way of limitation, and the coupling 40 may be connected to other suitable portions of the seal 1, such as, for example, to the side section 2, without departing from the purview of the broader aspects of the present invention.

Because of the low pressure of the air fed into the inflatable members 10 and 20 during periods of use, wherein the inflatable members 10 and 20 are inflated, the tubular body members 11 and 21 are readily compressible, so that when a truck backs into operative engagement with the inflated loading dock seal 1, the tubular members 11 are compressed thereby and are effective to wrap around the read edge portions of the side walls of the truck in good sealing relation thereto, and the tubular member 21 is compressed by and is effective to wrap around the rear edge portion of the top of the truck in good sealing relation thereto.

If desired, in the operation of the loading dock seal 1, instead of inflating the members 10 or 20 before engagement thereby with a truck, a truck may be backed into engagement with, or in closely adjacent relation to, the sections 2–4 while the inflatable members 10 and 20 thereof are in deflated condition, and air may subsequently be fed through the coupling 40 into the inflatable members 10 and 11 to inflate the latter and thus cause them to move outwardly into the aforementioned sealing engagement with the adjacent rear edge portions of the truck.

One of the important features of the present invention is the embodiment of the resilient pads 8 and 18 in the side sections 2 and 3 and the head section 4, respectively. In the preferred form of the loading dock seal 1, the pads 8 and 18 are of such thickness that they project outwardly from the wall of a warehouse a minor portion of the entire outward projection of the inflated loading dock seal 1, while still projecting outwardly a sufficient distance that if a truck is backed into engagement with a loading dock seal 1, while the latter is in deflated condition, the rear edge of the truck will effectively sealingly compress the pads 8 and 18 prior to the truck engaging other projections, such as the bumpers 48, mounted on the warehouse to limit the movement of such a truck toward the warehouse. For example, in a loading dock seal 1, wherein the overall projection of the seal 1 from a warehouse wall is 22 inches, and the thickness of the backing members 7 and 17 is 2 inches, and bumpers, such as the bumpers 48, which are mounted on the warehouse 4 inches outwardly therefrom, the pads 8 and 18 preferably are not substantially less than 4 inches thick and not substantially greater than 8 inches thick, and preferably are in the nature of 6 inches thick. With such construction, it will be seen that a truck backed into the deflated loading dock seal 1 may effectively sealingly compress the pads 8 and 18, and cause the latter to wrap around the rear edge portions of the truck.

Also, it will be seen that, with such construction, the tubular members 10 and 20, which are the inflatable portions of the loading dock seal 1, may be of considerably smaller size then would be true if the pads 8 and 18 were not embodied in the seal 1, while still affording the same projection from the warehouse wall 5, so that there is a smaller amount of inflatable material, which, when deflated, tends to droop or sag downwardly, afforded in the loading dock seal 1 than would be true if the aforementioned projection from the warehouse wall was afforded only by an inflatable member, without the pads 8 and 18 embodied therein.

From the foregoing it will be seen that the present invention affords a novel loading dock seal of the inflatable type.

Also, it will be seen that the present invention affords a novel loading dock seal of the aforementioned type which affords effective sealing engagement with a truck backed thereagainst, irrespective of whether the seal is in inflated or deflated condition.

Further, it will be seen that the present invention affords a novel loading dock seal of the inflatable type wherein the inflatable portion thereof may be relatively small in size, while affording effective sealing engagement with a truck backed thereagainst.

Also, it will be seen that the present invention affords a novel loading dock seal of the type which embodies inflatable head and side sections, and wherein the various sections thereof are constituted and arranged in a novel and expeditious manner such that each of the sections may be quickly and easily, individually removed and replaced without disturbing any of the other sections.

In addition, it will be seen that the present invention affords a novel loading dock seal of the inflatable type which is practical and efficient in operation and which may be readily and economically produced commercially.

Thus, while we have illustrated and described the preferred embodiment of our invention, it is to be understood that this is capable of variation and modification, and we therefore, do not wish to be limited to the precise detail set forth, but desire to avail ourselves of such changes and alterations as fall within the purview of the following claims.

We claim:

1. In a loading dock seal of the type to sealingly engage a truck disposed in loading and unloading position relative to a doorway in a warehouse wall,
    a. an elongated section, and
    b. means for securing said section on such a wall in position to extend along such a doorway in position to so engage such a truck
    c. said section comprising
        1. an elongated backing member adapted to be mounted on such a wall with one side thereof disposed in facing relation to said wall,
        2. an elongated compressible resilient pad mounted on the side of said backing member remote from said one side, and
        3. an inflatable member
            a. secured to said backing member by means disposed exteriorly of said pad, and
            b. projecting outwardly from the side of said pad remote from said backing member,
    d. said pad being secured to said second mentioned side of said backing member in substantially covering relation thereto,
    e. said inflatable member comprising a tubular portion having two spaced securing means extending therefrom, and
    f. said securing means being secured to respective opposite edge portions of said backing member in position to support said tubular portion in overlying juxtaposition to said side of said pad remote from said backing member.

2. A loading dock seal for mounting on a wall having a doorway therein, said seal comprising
    a. an elongated head section,
    b. two elongated side sections,
    c. each of said sections comprising
        1. an elongated resilient pad having one face adapted to be disposed in facing relation to such a wall, and
        2. an inflatable member
            a. mounted on the face of said pad remote from said one face, and
            b. projecting outwardly therefrom in a direction perpendicular to said one face, and
    d. means directly connected to said inflatable member exteriorly of said pad and securable to such a wall for supporting respective ones of said sections in position to extend along respective sides of said doorway in such a wall with said one face of said pad of each of said sections being disposed in said facing relation to said wall 3. A loading dock seal as defined in claim 2, and in which
   a. each of said sections includes a backing plate mounted on said one face of said pad.
4. A loading dock seal as defined in claim 3, and in which
   a. said inflatable members comprise tubular body portions, and
   b. said means for supporting said sections comprise spaced securing members projecting from the exterior of said body portions, and
   c. said securing members are secured to respective opposite edge portions of respective ones of said backing plates in position to support said tubular body portions in position to dispose the exteriors thereof in overlying covering relation to respective ones of said pads.
5. A loading dock seal as defined in claim 3, and in which
   a. each of said inflatable members comprises a tubular body portion mounted on the face of said pad remote from said backing plate.
6. A loading dock seal as defined in claim 3, and which includes
   a. means for interconnecting said inflatable members for the passage of air therebetween.
7. A loading dock seal as defined in claim 6, and in which
   a. said means for interconnecting comprise
      1. openings in said pads for feeding air between adjacent ones of said sections, and
      2. openings between said pads and said inflatable members in respective ones of said sections for feeding air therebetween.
8. A loading dock shelter as defined in claim 7 and in which
   a. said means for interconnecting comprise
      1. means disposed around said first mentioned openings for releasably and repeatedly securing the latter in operable communication with each other for the passage of air therebetween.

* * * * *

Dedication 3,939,614.—*Cyril P. Frommelt* and *Sylvan J. Frommelt*, Dubuque, Iowa. LOADING DOCK SEAL. Patent dated Feb. 24, 1976. Dedication filed Sept. 15, 1977, by the assignee, *Dubuque Awning & Tent Company*.

Hereby dedicates to the Public the entire term of said patent.
[*Official Gazette November 15, 1977.*]